Aug. 19, 1930.   L. J. CAMPBELL   1,773,216
SPEED CHANGING MECHANISM
Original Filed May 26, 1924   5 Sheets-Sheet 1
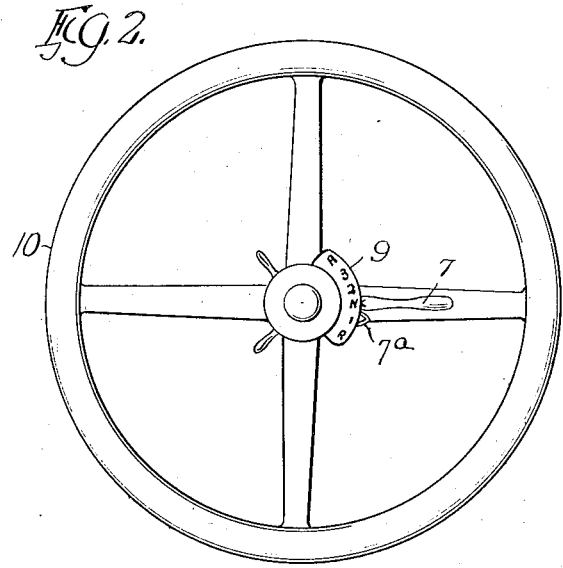
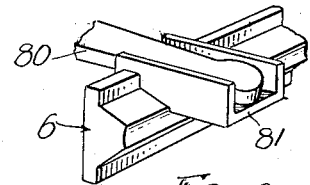
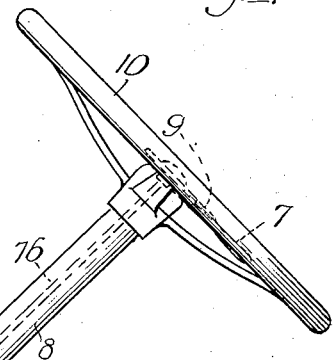
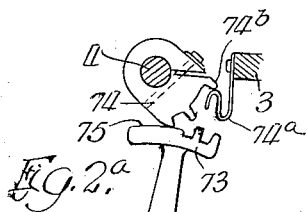
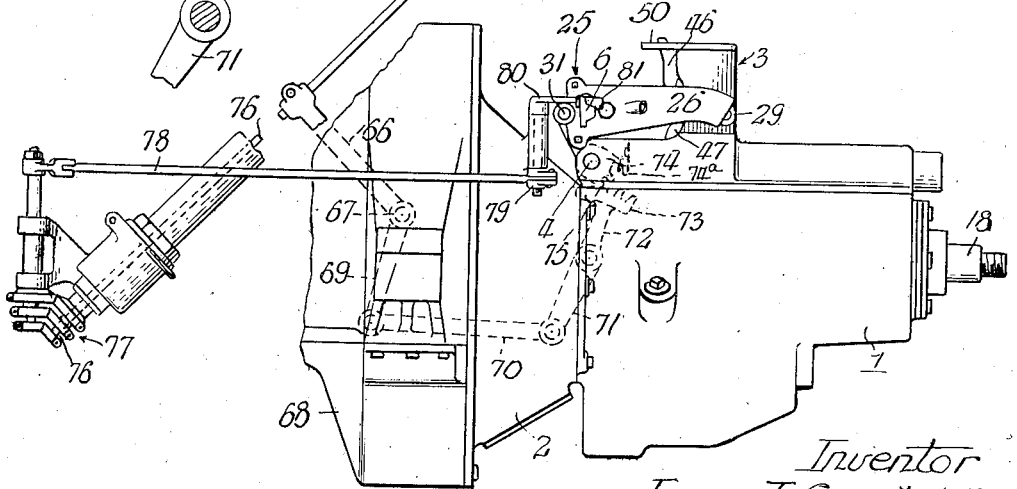
Inventor
Leon J. Campbell Aug. 19, 1930. L. J. CAMPBELL 1,773,216
SPEED CHANGING MECHANISM
Original Filed May 26, 1924   5 Sheets-Sheet 2
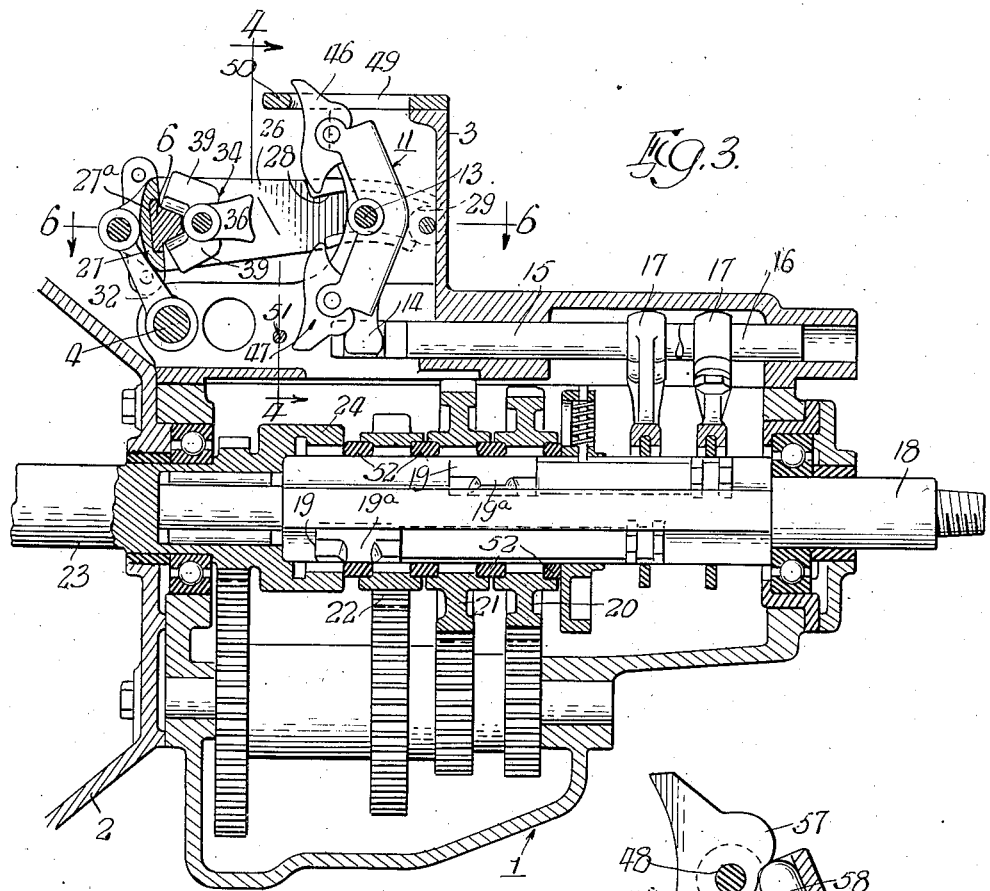
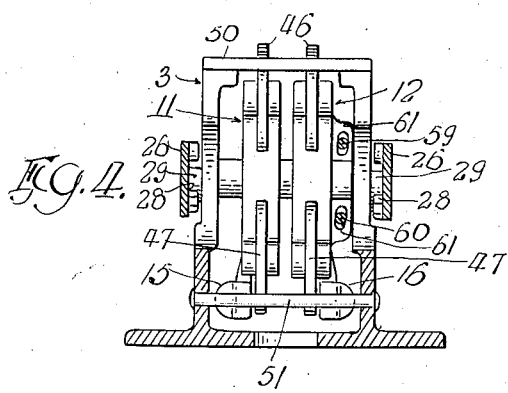
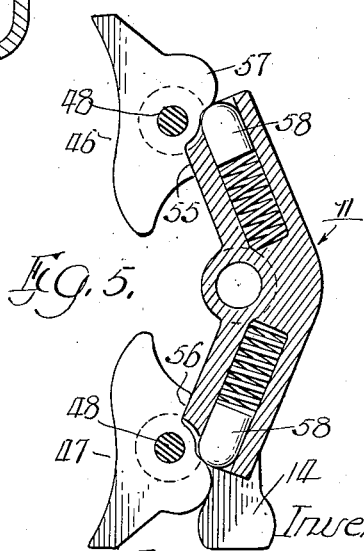
Inventor
Leon J. Campbell Aug. 19, 1930.  L. J. CAMPBELL  1,773,216
SPEED CHANGING MECHANISM
Original Filed May 26, 1924   5 Sheets-Sheet 3
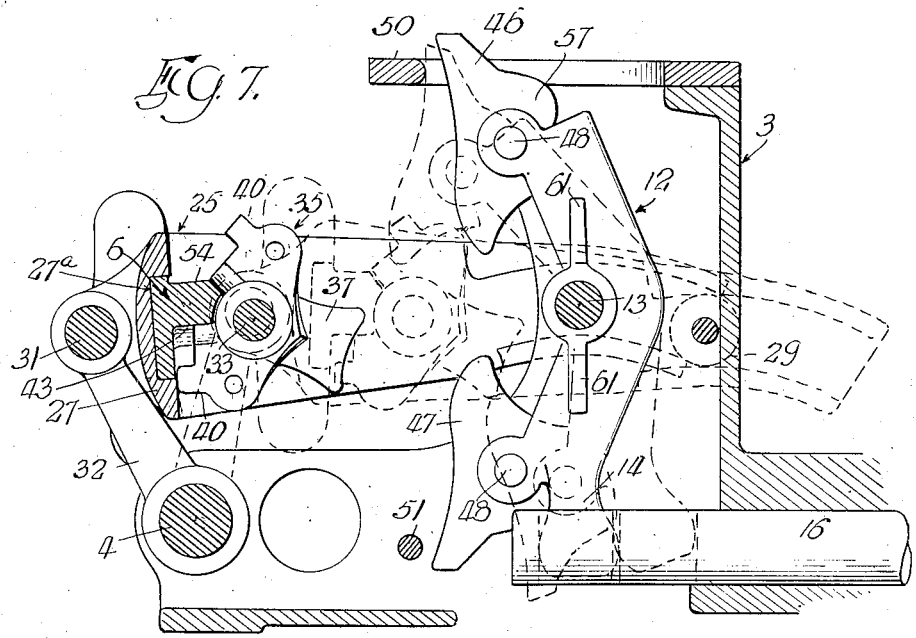
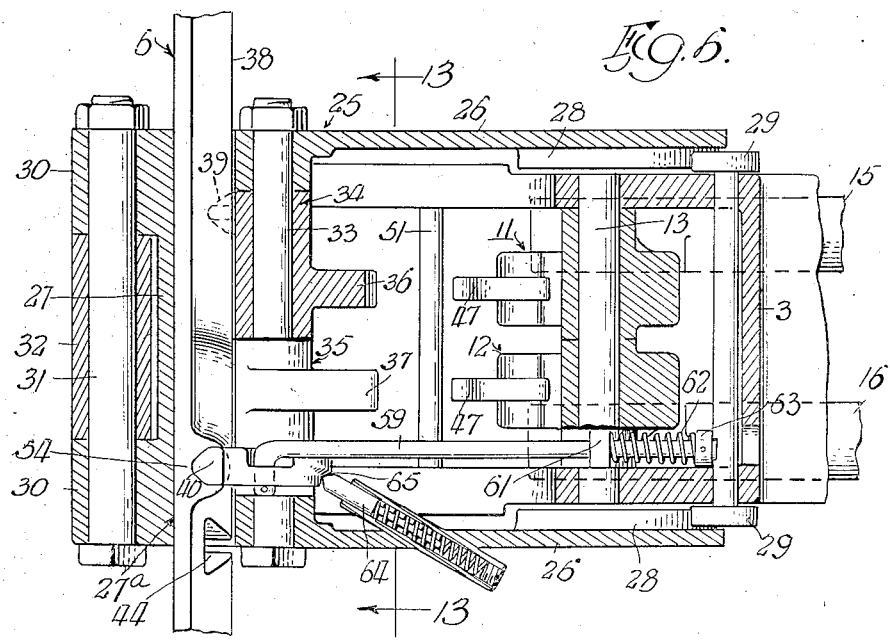
Inventor
Leon J. Campbell

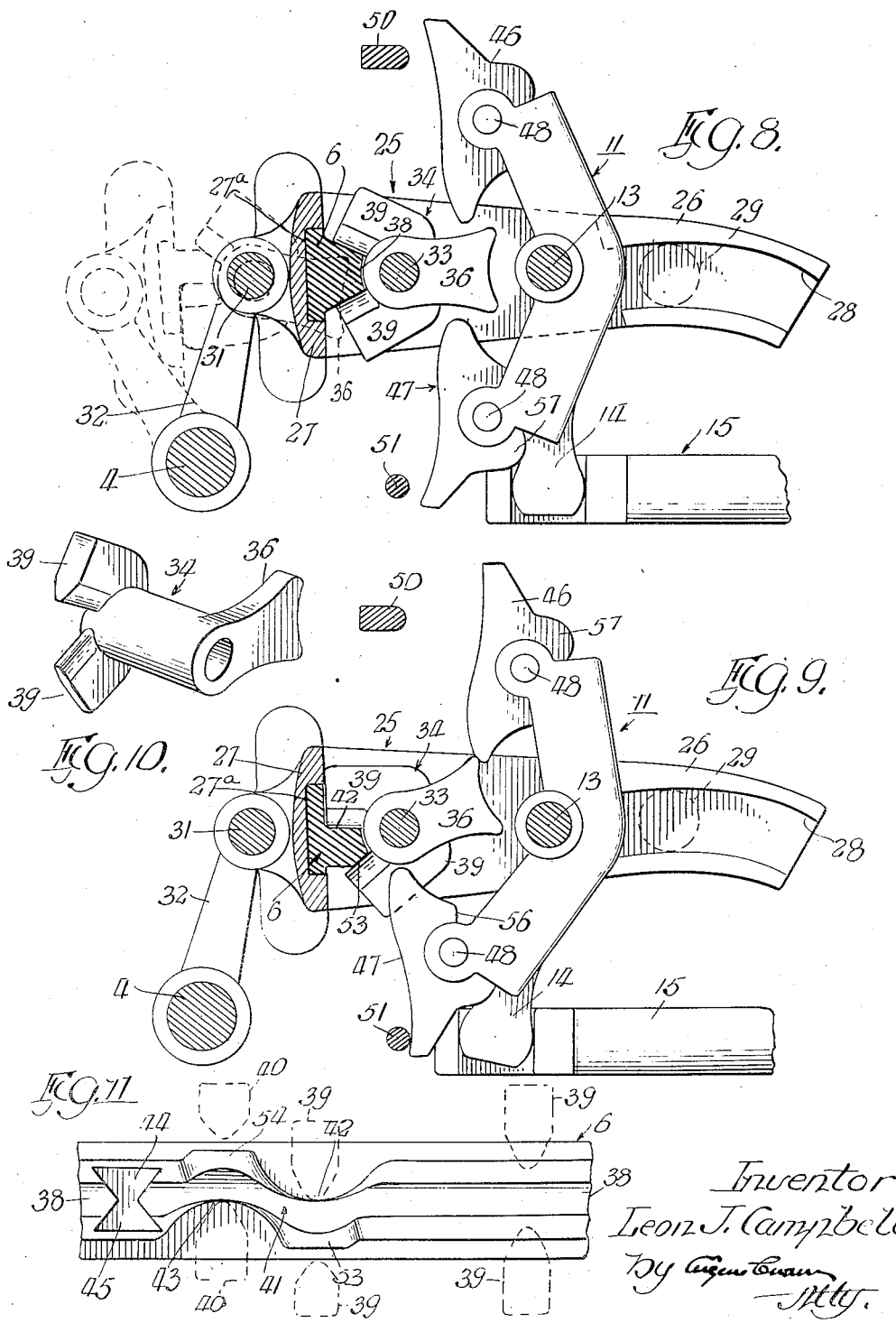

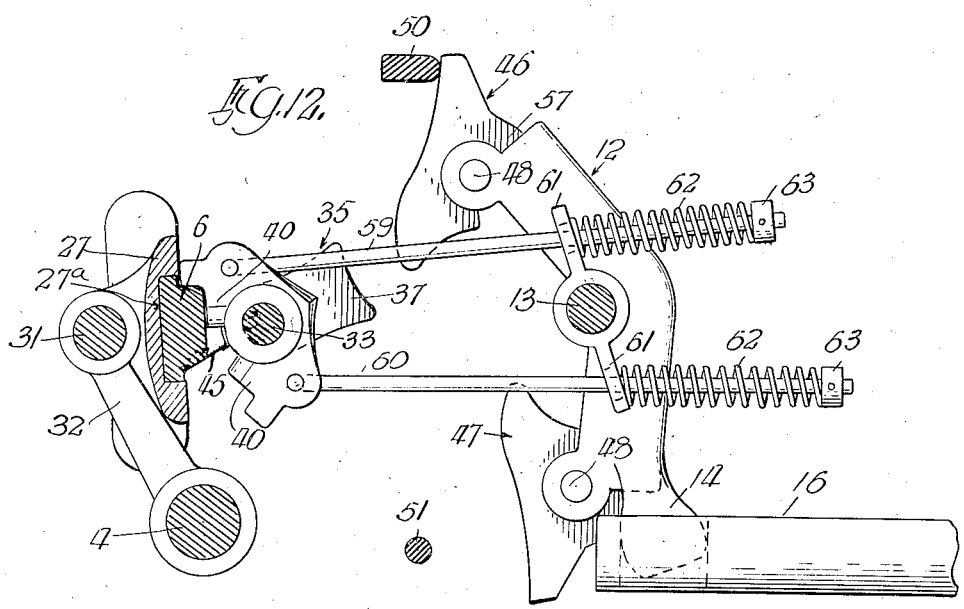
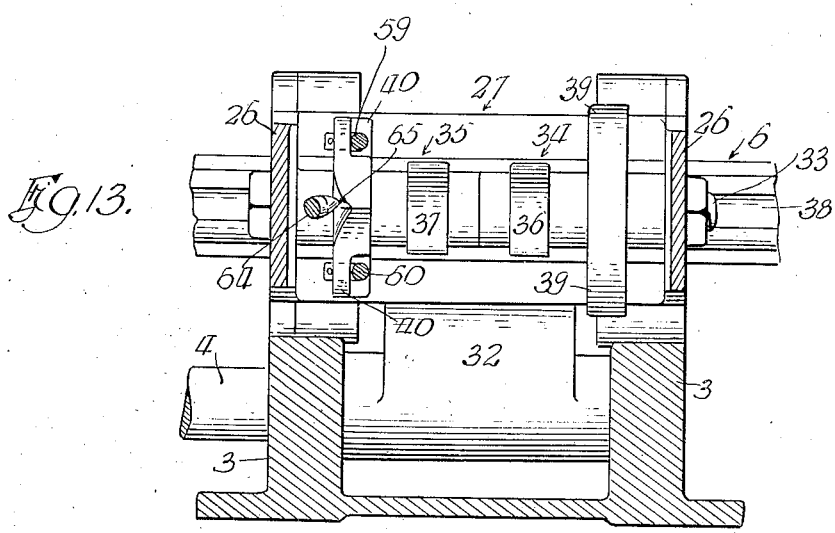

Patented Aug. 19, 1930

1,773,216

UNITED STATES PATENT OFFICE

LEON JAY CAMPBELL, OF BUCHANAN, MICHIGAN, ASSIGNOR TO CAMPBELL TRANSMISSION COMPANY, OF BUCHANAN, MICHIGAN, A CORPORATION OF MICHIGAN

SPEED-CHANGING MECHANISM

Application filed May 26, 1924, Serial No. 715,822. Renewed June 23, 1930.

This invention relates to speed changing mechanisms for automobiles or other motor vehicles, and more particularly to such mechanisms which are actuated by the clutch pedal to effect speed changes, the speeds being selected in advance by the operation of a selective device from the steering wheel or other convenient location.

Among the objects of my invention is to improve the construction and operation of such mechanisms in several particulars as will hereinafter more fully appear, and to provide in particular a speed changing mechanism adapted for use with a transmission mechanism of the all-in-mesh gear key type disposed in a number of my prior patents and more particularly in No. 1,388,548, granted August 23, 1921.

Another object of my invention is to so construct the shift levers that a greater leverage is exerted on the keys to withdraw them under the rings from locked engagement with the gears than when sliding the keys from the rings to the gears and thus proportion the leverage to the resistance offered to the keys as they are moved from the rings to the gears and vice versa, all without increasing the throw of the clutch pedal.

A further object of my invention is to provide a construction which, when set in a position designated "A" or "Automatic" on the selective mechanism, will automatically and alternately effect certain predetermined speed changes on actuation of the clutch pedal, so that when driving in traffic it will be unnecessary for the driver to move the selector lever back and forth for second and third speeds each time these speeds are required, inasmuch as when set in automatic position said speeds will be automatically and alternately obtained on actuation of the clutch pedal without further attention to the selective mechanism.

A still further object of my invention is to provide a construction permitting a selective mechanism to be readily and easily actuated even when engaged with the speed changing elements.

Other and further objects of my invention will appear from the following specification taken in connection with the accompanying drawings, in which—

Fig. 1 is a side view of a steering post and wheel and a transmission unit equipped with the speed changing mechanism of my invention;

Fig. 1ª is a perspective view of a structural detail to be hereinafter described;

Fig. 2 is a top plan view of the steering wheel showing the selector lever and its fixed segment plate;

Fig. 2ª is an enlarged side view of a detail of structure to be hereinafter described;

Fig. 3 is an enlarged longitudinal sectional view through the transmission unit of Fig. 1 and showing the application of my invention thereto;

Fig. 4 is a vertical sectional view taken on line 4—4 of Fig. 3;

Fig. 5 is a vertical sectional view, with parts in elevation, taken through one of the shift levers;

Fig. 6 is an enlarged horizontal sectional view taken on line 6—6 of Fig. 3;

Figs. 7, 8, and 9 are detail views showing the shift levers and associated parts in the different positions they occupy in the operation of my device;

Fig. 10 is a perspective view of one of the lug carrying selectors;

Fig. 11 is a face view of the selector adjusting bar;

Fig. 12 illustrates parts of the automatic mechansm heretofore mentioned; and

Fig. 13 is a vertical sectional view taken on line 13—13 of Fig. 6.

In Fig. 1, 1 indicates the outside casing of a transmission mechanism of the all-in-mesh gear key type of my aforesaid prior patent. To the front end of this casing is secured the ball housing 2 of the clutch casing as in motor vehicle construction. Bolted or otherwise secured to the top of the casing 1 is a housing 3, in which is journaled a horizontally arranged rock shaft 4. Said shaft 4 extends out through the housing 3 at one side of the same and is connected with a clutch pedal 5 in a manner to be hereinafter described so that speed changes may be effected by the driver pushing down on the clutch pedal after releasing the clutch.

To select the speed desired in advance of actually changing the speed through the clutch pedal 5, I provide in the speed changing mechanism an endwise slide bar 6 connected in a manner to be hereinafter described with a selector lever 7 at the upper end of the steering post 8 and operating in conjunction with a fixed segment plate 9 at the steering wheel 10 and having suitably marked thereon the different speed changes, by abbreviations, indicating reverse, first, second, third, neutral, and automatic.

Mounted in the housing 3 are two vertically arranged shift levers 11 and 12. These levers are arranged side by side and are rockably mounted on a horizontal shaft 13 supported by the housing 3. The levers 11, 12 are provided at their lower ends with depending lugs 14, one on each lever, said lugs engaging shift rods 15, 16, as shown in Figs. 3 and 9. Each shift rod carries at or adjacent its opposite end a yoke 17 extending down into the casing 1 to the shaft 18 of the transmission mechanism. Said yokes engage keys 19, 19 slidable and rockable in grooves or keyways in said shaft 18, as more particularly shown in my said prior patent. Loosely mounted on this shaft 18 are a number of speed gears 20, 21, and 22, decreasing in diameter in the order named and constituting reverse, first, and second speeds, respectively. The clutch shaft 23 carries a gear-like member 24 over the adjacent end of the shaft 18 and, when engaged with said shaft 18 by the set of keys 19 therefor, third speed or direct drive is obtained.

The slide bar 6 is carried by a frame 25 comprising two side members 26, 26 and a cross-member 27 at the forward end of the frame, as shown in Fig. 6. Said cross-member 27 is provided with a groove or slideway 27ª to receive the bar 6, the latter being held from displacement in said groove by the bar extending through T-like openings in the side members 26 of the frame. (See Fig. 1.) The side members 26, 26 embrace the casing or housing 3 on the outside and are provided with inside grooves 28, 28 to receive guide rollers 29, 29 on the casing 3. The cross-member 27 is provided with ears 30, 30 to support a shaft 31 engaged by a link 32 fixed to the shaft 4 so that the frame 25 may be moved toward and from the levers 11, 12 on rocking said shaft by the clutch pedal 5.

The selector mechanism is carried by the frame 25 between the slide bar 6 and the levers 11, 12, as shown in the drawings and more particularly in Fig. 6. Said mechanism includes a shaft 33 extending between the side members 26, 26 of said frame and having loosely mounted thereon two selectors 34, 35. These devices are in the form of sleeves provided with integral lugs 36, 37, one on each sleeve. These lugs extend toward the levers 11, 12, there being one lug for each of said levers. The slide bar 6 is provided with a rib 38 extending endwise thereof and projecting toward the selectors 34, 35. The selector 34 is provided with a pair of vertically spaced lugs 39, 39 on that side of the same adjacent the rib 38, the latter extending through the space between the lugs. The other selector 35 is provided with a pair of similarly spaced lugs 40, 40 (Fig. 12), and the rib 38 extends between them in the same manner as the first mentioned lugs.

Said rib 38 between its ends is provided with a reversely curved section 41, as clearly shown in Fig. 11. This curved section provides two concave depressions or recesses 42, 43 in said rib with one depression on the upper side of the rib and the other depression on the under side thereof. The rib 38, as shown in Fig. 11, is provided on one side of the depression 43 with upper and lower notches 44, 45, these notches being substantially V-shape and opening into each other through the rib, as shown. The portions of the rib 38 on opposite sides of these depressions and notches are somewhat triangular in cross-section and are substantially uniform throughout. The space between the two pairs of lugs 39, 40 is made complementary to the triangular shaped portions of the rib 38, so that, when such portions are between said lugs, the selectors 34, 35 are held against rocking, thus maintaining their actuating lugs 36, 37 in fixed positions, as indicated in Figs. 3 and 8. The lugs 39 and 40 of each set may be arranged at a twenty-five degree angle.

Each lever 11 and 12 is provided with end members 46, 47, said members being pivoted by pins 48 to the ends of the lever and projecting on opposite sides of the same, as shown in the drawings. These members 46, 47 are on opposite sides of the axis 13 of the levers 11, 12 and through them the levers are rocked to shift the rods 15, 16 to effect speed changes. The upper members 46 of both levers 11, 12 extend through an opening 49 in the top plate of the casing or housing 3, as shown in Figs. 3 and 7, and the upper ends of these members 46 come into contact with a fixed abutment 50 on said plate during a part of the operation of the device for the purpose to be presently described. A like abutment 51 is arranged in the casing 3 in front of the lower ends of the lower members 47, 47 for the same purpose.

In Fig. 3, the levers 11, 12 and associated parts are in neutral position, that is, the lugs 19ª of the keys 19, 19 are under rings 52 between the gears and none of the gears are clutched to the shaft 18. The selector lugs 36, 37 are held in their midway positions, as shown in Figs. 3 and 8, so as to pass freely between the inner ends of the upper and lower members 46, 47 of the levers 11 and 12 when the frame 25 is rocked back and forth by the clutch pedal 5. The grooves 28 in the side members 26, 26 of the frame 25 are slightly curved (Fig. 8) to guide the frame toward and from the levers 11, 12 in a substantially straight line passing through the axis 13 of the levers 11, 12 and the axis of the shaft 31 at the upper or swinging end of the link 32. By this construction a substantially straight horizontal movement is imparted to the lugs 36, 37 when rocking the frame, so that said lugs may pass freely between the inner ends of the members 46, 47 without striking them. The triangular shaped rib 38 on the slide bar 6 holds the lugs 39 and 40 against rocking and therefore maintains the actuating lugs 36, 37 in the neutral position described.

At the depressions 42, 43, the rib 38 is provided with two boss-like cam projections 53, 54, the former being beneath the depression 42 and the latter above the depression 43. These projections have their front surfaces inclined and curved to conform to the curvature of the depressions, as shown in Fig. 11. These projections 53, 54, in the endwise movement of the bar 6, operate on the lugs 39, 40 to rock the selector lugs 36, 37 into and out of operating positions in a manner to be presently described.

To select first or low speed, the bar 6 is moved endwise through the selector lever 7 at the steering wheel in a direction toward the right when the bar is viewed as in Fig. 11, thereby causing the lower cam projection 53 to be moved into contact with the lower lug 39 on the selector 34 and force that lug downward as the upper lug 39 moves down into the recess or depression 42 on the upper side of the bar 6, this depression permitting the lugs to rock in the manner stated. (See Figs. 9 and 11.) In this movement of the selector 34 the actuating lug 36 is swung upward to bring said lug in line with the inner end of the upper member 46 on the lever 11 to rock the latter when the frame 25 is moved toward said lever, as shown in Fig. 9. The lower end of the lever 11 is moved forward, that is, toward the shaft 4, to effect movement of that set of keys 19 through the shift rod 15 to produce first speed.

For second speed, the bar 6 is moved in the opposite direction and, when the projection 54 comes in contact with the upper lug 40, that lug rides up on the projection, thereby rocking the selector 35 in a direction to cause its operating lug 37 to be rocked down to be in line with the inner end of the lower member 47 on the lever 12 (full lines, Fig. 7) so that on moving the frame 25 toward said lever the lug 37 on engaging the lower member 47 will rock the lower end of the lever 12 to the rear, that is, away from the shaft 4, and through the shift rod 16 effect movement of the keys 19 to produce second speed.

On moving the bar 6 into the position just described, the right-hand side of the recess 42 raises the upper lug 39 and rocks the operating lug 36 into its midway or neutral position, as shown in Figs. 3 and 8, and on moving the frame 25 toward the levers 11, 12, the lug 36 will come into contact with the inner end of the lower member 47 on the lever 11 before the lug 37 contacts with the inner end of the lower member 47 on the lever 12, with the result that the lever 11 is swung back to neutral position before the lever 12 is operated on, thus releasing the first speed before second speed is secured. After bringing the lever 11 into neutral position, then the lug 37 operates on the lower member 47 of the lever 12 to rock it for second speed.

To obtain third speed or direct drive, the bar 6 is moved to the left, carrying the lower projection 53 into contact with the lower lug 40, thereby rocking the lug 37 upward into position to engage against the inner end of the upper member 46 on the lever 12 on swinging the frame 25 toward said lever. Fig. 12 shows the lug 37 in this position. The other lug 36 remains in neutral position by reason of the fact that its lugs 39, 39 are held against swinging by the triangular shaped rib 38 of the bar 6 being between them.

For reverse, the bar 6 is moved toward the right to bring its projection 54 under the upper lug 39. In this movement of the bar, the lug 36 is rocked downward to engage the lower member 47 on the lever 11 for rocking said lever. (See dotted lines in Fig. 8.) Each lever 11 and 12 controls two speeds, and these are obtained by rocking the levers back and forth. In the particular structure shown and described, lever 11 controls first speed and reverse, while lever 12 controls second and third speeds.

In my all-in-mesh gear type of transmission, the speed gears run on the rings 52 which surround the shaft 18 between the gears. A relatively smaller amount of power is required to slide the keys 19 from under the rings 52 up into the gear (25 pounds) than required for drawing the keys from the gears down under the rings (100 pounds) because of the fact that the ends of lugs 19a on the keys are brought against the rings. The specific amounts given would of course vary in accordance with the stiffness of the springs used with the keys, but it usually takes about four times as much to pull the lugs down under a ring as it does to move them up into a gear. By providing the levers 11, 12 with their upper and lower members 46, 47, I am able to increase the leverage exerted by said levers on the keys at the time the greatest leverage is required without increasing the throw of the clutch pedal 5 or placing any more pressure on it. When the levers 11 and 12 are both in neutral, the upper and lower members 46, 47 are both out of contact with their respective abutments 50, 51, as shown in Figs. 3 and 8. At this time, the lugs 19ᵃ of the keys 19 are under the rings 52 and are held out of clutch engagement with any of the speed gears in the transmission. The leverage required to move a key from under a ring to engagement with a gear is comparatively small and, when shifting from neutral to first or low speed, the leverage exerted on the lever 11 by the actuating lug 36 is measured from the fulcrum 13 of the lever to the shoulder 55 where the upper member 46 engages said lever. (See Fig. 5.)

To gain the increased leverage required for rocking the lugs of the keys under their rings from locked engagement with the gears without increasing the normal throw of the clutch pedal 5, attention is directed to Fig. 9. When the lever 11 is in position for first speed, as shown in Fig. 9, the lower member 47 of that lever is in contact with the lower abutment 51, holding the shoulder 56 of said member out of engagement with the lever 11 so that when the lug 36 is moved into contact with the inner end of the lower member 47, the leverage on the lever 11 is then measured from the fulcrum 13 of the lever to the point of contact with the abutment 51 and, as this distance is outward from the pivotal point of the member 47, the amount of leverage exerted on the lever 11 at this time is sufficient to rock and slide the key under the ring. When that happens, the lower member 47 has been moved until its shoulder 56 contacts with its lever 11, whereupon the force of the thrust is then transferred to the lever 11 at or adjacent the shoulder and leverage on the lever decreased in proportion to that required merely to slide the key under the ring. The upper members 46 operate in the same way in conjunction with the top abutment 50. By the structure shown and described, the normal leverage of the levers is restored after the keys have been rocked to slide under the rings.

Each member 46, 47 is provided on its rear side beyond its pivotal point with a projection 57 (Fig. 5) against which constantly bears a spring pressed plunger 58 carried by the associated lever 11 or 12. These plungers carry the shoulders 55 and 56 of these members into contact with their respective levers when the members are out of contact with the abutments 50, 51.

When driving in traffic, the operator of the car is required to shift repeatedly from second to third speeds and vice versa, each time releasing the clutch in order to make the speed changes required. To avoid the necessity for moving the selector lever 7 back and forth from second to third speeds for these speed changes, I provide an automatic arrangement whereby, when the selector lever 7 is set at a position marked "Automatic" or "A" on the segment plate 9, there will be a change back and forth from second to third speeds by merely operating the clutch pedal each time the desired speed change is required and this repeated as often as required without manipulating or paying further attention to the selector lever 7 at the steering wheel.

To carry out this feature of my invention, I employ the notches 44 and 45 in the slide bar 6. These notches by being in registration permit the lugs 40, 40 to freely rock up and down in them without being held against movement in either direction by any portion of the rib 38 when the notches are at said lugs. Extending rearwardly from these lugs are rods 59, 60, there being a rod for each lug, as shown in Fig. 12. These rods are on opposite sides of the axis of the lugs 40 and project through webs or flanges 61, 61 on one side of the lever 12 and there carry light coiled springs 62, 62 of equal length between said webs and fixed collars or enlargements 63 on the free ends of the rods, as shown in said Fig. 12. The webs 61 are vertical when the lever 12 is in neutral position, so that as the lever is rocked back and forth the angle of these webs to the vertical changes first to one side of the vertical plane and then to the other to rock the lug 37 first up and then down by alternately acting against said springs.

Fig. 12 shows the actuating lug 37 raised for contact with the upper member 46 for rocking the lever 12 into position for third or high speed. This movement shifts the lower end of the lever 12 toward the shaft 4 and brings the lower member 47 against its abutment 51. On the return stroke of the frame 25, the lug 37 is swung downward after clearing the upper end of the lower member 47 due to the pull on the upper rod 59, said rods with respect to their pivotal points and webs 61 in effect shortening and lengthening in the movement. The collars 63 on both rods are at equal distances from the pivotal points of the rods.

With the lug 37 positioned to engage the lower member 47, the lever 12 will be rocked for second speed on again moving the frame 25 toward said lever. On the return of the frame 25 to starting position, the lug 37 after clearing the upper member 46 is rocked up for the said member by the lower rod 60. In this rocking action, the springs 62 are in effect parts of the collars 63, and cushion the movement. The webs 61 have elongated holes for the rods to pass through to allow for changes in angular positions of the webs and rods.

To keep the lug 37 in the positions to which it is moved by the rods 59, 60 while the parts are operated in "Automatic," I provide a spring pressed plunger 64 on the side member 26 of the frame at the lever 12, as shown in Fig. 6. This plunger has a conical outer end bearing against a V-shaped projection 65 on the sleeve 35 between the lugs 40, 40. As the outer end of said plunger 64 rides over the apex of said projection 65 in the turning of the lugs 40, it snaps the lug 37 into the position into which it is being turned by the rods 59, 60 and holds the lug from being jarred or accidentally moved out of such position.

The projection 65 is off center of shaft 33 and, when the lug 37 is neutral, the plunger 64 pressed downward on the upper side of the projection. When the selector lever 7 is moved directly from first or neutral to automatic, the plunger 64 will rock the lug 37 into position for second speed as soon as the notches 44, 45 reach the lugs 40. The plunger does not prevent the rocking of the lug 37 when not in automatic. Being able to select automatic from neutral or any other speed, enables an immediate setting for second speed without stopping at that speed. Having the automatic speed arranged at one end of the segment plate 9, stops the lever 7 at automatic when moved to that end of the plate. This prevents going beyond automatic and facilitates driving, especially at night because the driver need not feel for the speed. With the latch 7ª at first speed at the opposite end of the plate, the lever 7 being moved in that direction until stopped by the latch selects first speed. With neutral just in advance of first speed, moving the lever back to the latch and up one selects neutral, making handling of the device convenient.

The connections between the clutch pedal 5 and rock shaft 4 are shown in Figs. 1 and 2ª. Said pedal 5 is carried by a lever 66 fulcrumed at 67 on the clutch housing 68 and by arms and links 69 to 71 is connected with a rock arm 72 having a segmental rack 73 to mesh with a toothed member 74 on the rock shaft 4. The rack 73 has a portion 75 free of teeth so that the clutch pedal 5 may be moved to release the clutch without actuating the shaft 4. To hold the member 74 against turning at this time, I provide a spring device 74ª fixed to the casing 3 and engaging a tooth 74ᵇ on said member, as shown in Fig. 2ª.

Fig. 1 also shows the connections between the selector lever 7 and the bar 6. As illustrated, said lever 7 is at the upper end of a rod 76 in the steering column 8. By a bevel gear assembly 77 at the lower end of said rod, the latter is connected by a link 78 with an upright rock shaft 79 carrying at its upper end an arm 80 which reaches to and engages the slide bar 6 in a fixed channel member 81 for actuating said bar.

The spring pressed plungers 58 on the levers 11 and 12 have another function. They allow the members 46, 47 to ride over the lugs 36, 37 without effecting any speed changes should either of said lugs be turned in the way of the members while between them at the end of a speed changing thrust of the frame 25.

When either lug 36, 37 is in position to rock a lever 11, 12, one of its associated lugs 39 or 40, as the case may be, abuts endwise against the inner face of the cross-member 27 of the frame (see Fig. 12) to take the end thrust of the lug on the lever. This applies the force of the blow against the strongest part of the frame and not on the rib 38 of the slide, which could not take it and moreover should not take it in order to be easily slidable for speed selecting. A suitable latch device 7ª may be used with the selector lever 7 to hold it from accidental movement and moving to reverse speed unless actually desired.

In addition to allowing for the rocking of the selector lugs 36 and 37, the recesses 42 and 43 in the bar 6 have another function, as follows. In case the driver in selecting a speed moves the lever 7 short of or beyond the mark indicated on the plate 9 for the speed desired, the recess 42 or 43 as the case may be will not be properly centered with respect to its selector lug 36 or 37. The lugs 39 or 40 as the case may be engage the sides of the recess and move the bar 6 to the extent required to properly center the selector lug on the thrust of that lug against its lever 11 or 12 in the actuation of the clutch pedal 5. This action properly centers the selector lug automatically and allows full benefit to be had of the thrust of the lug on its shift lever. Thus the driver is not required to bring the selector lever 7 to an exact marking on the plate 9 for a speed. The contact faces of the selector lugs 36 and 37 and their end members 46 and 47 are rounded complementary so that a longer period of contact is maintained between on shifting the levers 11, 12 and thus gain full benefit of the stroke of the frame 25.

While I have shown and described herein in detail a mechanism of my invention, the details of structure may be variously changed and modified without departing from the spirit and scope of my invention.

I claim as my invention:

1. The combination with a change speed transmission mechanism including speed gears and movable keys on the speed gear shaft for selectively connecting said gears thereto, of shift levers connected with said keys for operating the same, means for increasing the leverage of said levers while withdrawing the keys from locked engagement with said gears, and selective means for actuating said levers.

2. The combination with a change speed transmission mechanism including speed gears and slidable and rockable keys on the speed gear shaft for selectively connecting said gears thereto, of shift levers connected with said keys for sliding the same, bearing rings between the gears, means for increasing the leverage of said levers while sliding and rocking the keys under the rings from locked engagement with the gears, and selective means for actuating said levers.

3. The combination with a change speed transmission mechanism including a clutch pedal, speed gears and movable keys on the speed gear shaft for selectively connecting said gears thereto, of shift levers connected with said keys for operating the same, means for increasing the leverage of said levers while withdrawing the keys from locked engagement with said gears by the clutch pedal during a part of its movement beyond clutch releasing position, and selective means actuated by said pedal for moving said levers.

4. In a speed changing mechanism for a motor vehicle, the combination of speed changing elements, means including a rock shaft for actuating said elements after selecting the same, a toothed member fixed on said shaft, a rockable rack to mesh with said member for turning the latter, and a clutch pedal connected with said rack for actuating the same, said rack having a portion free of teeth so that said clutch pedal may be moved to release the clutch before turning said shaft.

5. In a speed changing mechansim for a motor vehicle, the combination of speed changing elements, means including a toothed member for actuating said elements after selecting the same, a rockable rack to mesh with said member for turning the latter, a clutch pedal for operating said rack, said rack having a portion free of teeth so that said clutch pedal may be moved to release the clutch before turning said member, and a spring device engaging one of the teeth of said member for holding the same against turning during the initial clutch releasing movement of the pedal.

6. In a speed changing mechanism, the combination of a pivoted shift lever, means for increasing the normal leverage of said lever during a part of its stroke and for restoring the normal leverage to said lever for the balance of its stroke, and selective means for moving said lever to effect a speed change thereby.

7. In a speed changing mechanism, the combination of a pivoted shift lever having pivoted end members, said members having their inner and outer ends on opposite sides of their pivotal connection with said lever, selective means for moving said lever by contact with the inner end of either end member, and fixed abutments to be engaged by the outer ends of said end members for increasing the leverage of said lever during a part of its movement, said members adjacent their pivots having shoulders to engage said lever after movement of the members out of contact with said abutments.

8. In a speed changing mechanism, the combination of a pivoted shift lever having pivoted end members, said members having their inner and outer ends on opposite sides of their pivotal connection with said lever, means for moving said lever including a lug to be rocked for engagement with the inner end of either of said end members, and fixed abutments to be engaged by the outer ends of said members for increasing the leverage of said lever during a part of its movement.

9. In a speed changing mechanism, the combination of a pivoted shift lever having pivoted end members, said members having their inner and outer ends on opposite sides of their pivotal connnection with said lever, means for moving said lever including a lug to be rocked for engagement with the inner end of either of said end members, and fixed abutments to be engaged by the outer ends of said members for increasing the leverage of said lever during a part of its movement, the inner ends of said end members having curved contact faces to prolong the period of contact between the lug and said members.

10. In a speed changing mechanism, the combination of a plurality of shift levers arranged side by side and having pivoted end members, said members having their inner and outer ends on opposite sides of their pivotal connection with the levers, rockable lugs one for each lever and adapted to be moved into contact with the inner ends of said end members for moving said levers, selector means for adjusting the lugs for said members, and spring means allowing said end members to trip over any lug in the path thereof on the outward movement of the lug from between said members.

11. In a speed changing mechanism, the combination of a plurality of shift levers arranged side by side and pivoted intermediate their ends, rockable lugs one for each lever, a carrier for said lugs and adapted to move the lugs toward and from the levers for shifting the latter, a bar movably mounted on said carrier, and coacting means between said bar and lugs for selectively adjusting the lugs for the opposite ends of said levers.

12. In a speed changing mechanism, the combination of shift levers arranged side by side and pivoted intermediate their ends, rockable lugs, one for each lever, a carrier for said lugs and adapted to move the lugs toward and from said levers for shifting the latter, a bar movably mounted on said carrier, and coacting means between said bar and lugs for selectively adjusting the lugs for the opposite ends of said levers, said coacting means setting one lug in neutral position each time another lug is set in speed changing position.

13. In a speed changing mechanism, the combination of a pivoted shift lever, a carrier, a selector rockably mounted thereon and having an actuating lug on one side for shifting said lever and two spaced lugs on the other side for rocking the selector, a bar slidably mounted on the carrier and extending between said spaced lugs, said bar having cam projections and recesses on opposite sides thereof for rocking the lugs on sliding the bar to adjust the actuating lug for either end of the shift lever, and means for moving the carrier to cause the actuating lug to actuate the lever.

14. In a speed changing mechanism, the combination of pivoted shift levers arranged side by side for various speeds, a carrier, selectors rockably mounted thereon and having lever actuating lugs on one side and spaced lugs on the other side, a bar slidably mounted on the carrier for selectively adjusting the actuating lugs for said levers by rocking the spaced lugs on sliding the bar, and means for moving the carrier toward and from said levers, said spaced lugs and carrier being in contact while effecting speed changes through said levers to relieve the bar of thrusts on said levers.

15. In a speed changing mechanism, the combination of pivoted shift levers arranged side by side for various speeds, a carrier, selectors rockably mounted thereon and having lever shifting lugs on one side and spaced lugs on the other side, a bar slidably mounted on the carrier and having a rib between said spaced lugs to rock the same for selectively adjusting the shifter lugs for said levers, said rib by the spaced lugs of the selectors holding all in neutral position, or one in neutral while another is in speed changing position.

16. In a speed changing mechanism, the combination of pivoted shift levers, a carrier, selectors rockably mounted thereon and having lever actuating lugs on one side and two spaced lugs on the other side, a bar slidably mounted on the carrier and extending between said spaced lugs, said bar having recesses on opposite sides thereof to receive said spaced lugs on rocking the selectors for said levers, and means for moving the carrier to actuate the levers by said selectors.

17. In a speed changing mechanism, the combination of pivoted shift levers, a carrier, selectors rockably mounted thereon for shifting said levers and having spaced lugs, a bar slidably mounted on the carrier for selectively adjusting the selectors for said levers by rocking the spaced lugs on sliding the bar, said bar having recesses permitting rocking of the lugs, said recesses having cam surfaces for centering the lugs on the thrust of the selectors against said levers, and means for moving the carrier toward and from said levers.

18. In a speed changing mechanism, the combination of shift levers arranged side by side and pivoted intermediate their ends, means for selecting and actuating said levers to effect speed changes, said means including a rockable lug for actuating one of said levers, and means set through the selector means for automatically rocking said lug to move its lever alternately back and forth in the operation of the lever actuating means.

19. In a speed changing mechanism, the combination of shift levers arranged side by side and pivoted intermediate their ends, a carrier, selectors rockably mounted thereon and having lever shifting lugs on one side and spaced lugs on the other side, means for moving said carrier toward and from said levers for actuating the levers by said selectors, and an endwise movable bar on the carrier and operating on said spaced lugs for selectively adjusting the shifter lugs for said levers, said bar having recesses to receive the spaced lugs of one selector on setting the bar for the automatic actuation of one lever alternately in opposite directions in the movement of the carrier toward and from said levers.

20. In a speed changing mechanism, the combination of shift levers arranged side by side and pivoted intermediate their ends, a carrier, selectors rockably mounted thereon and having shifter lugs on one side and spaced lugs on the other side, means for moving said carrier toward and from said levers for shifting the latter by the shifter lugs, and a slide bar on said carrier, said bar having a rib between said spaced lugs, said rib having cam projections and recesses on opposite sides thereof for rocking the lugs on sliding the bar to selectively adjust the shifter lugs for the ends of said levers, said rib having additional recesses to receive the spaced lugs of one selector on setting the bar for the automatic actuation of one shift lever alternately in opposite directions in the movement of the carrier toward and from said levers, said rib by the spaced lugs of the other selector holding its shifter lever in neutral position during the automatic operation of the other shift lever.

21. In a speed changing mechanism, the combination of shift levers arranged side by side and pivoted intermediate their ends, rockable lugs for said levers and adapted to be carried toward and from the latter for actuating the same, means for selectively adjusting the lugs for said levers, rods on opposite sides of the pivoted axis of one lever and connecting said lever with one of said lugs, and means set through the selector means for automatically rocking said lug by said rods to rock the lever of said lug alternately back and forth in the movement of the lugs toward and from said levers.

22. In a speed changing mechanism, the combination of a pivoted shift lever having pivoted end members, said members having their inner and outer ends on opposite sides of their pivotal connection with said lever, a rockable lug for said lever and adapted to shift the same by alternately connecting with the inner ends of said members, and means for rocking said lug by said lever in the outward movement of the lug from said lever, said means acting after the lug has cleared the member at the opposite end of the lever.

23. In a speed changing mechanism, the combination of a shift lever pivoted intermediate its ends, a rockable lug for said lever and adapted to be carried toward and from the lever for shifting the same, rods connected with said lug on opposite sides of its pivot and extending toward said lever, said lever having projections on opposite sides of its pivot to slidably receive said rods, abutments on said rods and coacting with said projections to shorten the effective lengths of the rods as the angles of the projections change to rock the lug in opposite directions by said lever, said abutments including springs permitting the rocking of the lug independent of said lever.

24. In a speed changing mechanism, the combination of shift levers arranged side by side and pivoted intermediate their ends, a rockably mounted member in front of said levers, a frame pivoted to said member and movable thereby in a substantially straight line toward and from the pivotal axis of said levers, and means on said frame for selectively actuating said levers by impact therewith.

25. In a speed changing mechanism, the combination with a support, of shift levers arranged side by side and pivoted on the support intermediate their ends, a rockably mounted member in front of said levers, a frame pivoted to said member and movable thereby toward and from the pivotal axis of said levers, said frame having guide members co-operating with said support for holding the frame to a substantially straight line movement, and means on said frame for selectively actuating said levers by impact therewith.

26. In a speed changing mechanism, the combination of shift levers arranged side by side and pivoted intermediate their ends, a support for said levers, a rockably mounted member in front of said levers, a frame pivoted to said member and movable thereby toward and from said levers, said frame having side members embracing said support, said side members and support having grooves and rollers, respectively, to guide the frame in its movement toward and from said levers, and means on said frame for selectively actuating said levers.

27. In a speed changing mechanism, the combination of shift levers arranged side by side and pivoted intermediate their ends, means for selecting and actuating said levers to effect speed changes, said means including a rockable lug for actuating one of said levers, means set through the selector for automatically rocking said lug to move its lever alternately in opposite directions, and means acting on said lug in the setting of the selector in automatic position for automatically rocking said lug for one end of its lever and releasably holding the lug in its selected position.

28. In a speed changing mechanism, the combination of shift levers arranged side by side and pivoted intermediate their ends, means for selecting and actuating said levers to effect speed changes, said means including a rockable lug for actuating one of said levers, means set through the selector for automatically rocking said lug to move its lever alternately in opposite directions, said lug having a cam portion, and a spring pressed plunger bearing against said portion and operating over an apex thereof for automatically rocking said lug for one end of its lever on the setting of the selector in automatic position.

29. A selector operating bar for a speed changing mechanism, comprising a body portion having a rib thereon, said rib having concave recesses and cam projections in opposite sides thereof, with a cam projection for each recess and on the side of the rib opposite its recess.

30. A selector operating bar for a speed changing mechanism, comprising a body portion having a rib thereon, said rib having concave recesses and cam projections in opposite sides thereof, with a cam projection for each recess and on the side of the rib opposite its recess, said rib having an opening extending through the same at one side of said recesses.

31. A selector operating bar for a speed changing mechanism, comprising a body portion having a rib thereon, said rib having straight end portions and an intermediate curved portion, the latter being reversely curved to provide concave recesses on opposite sides of the rib, said rib having cam projections, one for each recess and on the side thereof opposite its recess.

32. The combination with a changeable speed transmission having a pull rod movable back and forth for different speeds, of a lever connected with said rod for moving the same in opposite directions, a ram movable toward and from said lever for actuating the same, and means for automatically changing the position of the ram for effecting alternate speed changes through said lever.

33. The combination with a changeable speed transmission having a pull rod movable back and forth for different speeds, of a lever connected with said rod for moving the same in opposite directions, a ram movable toward and from said lever for actuating the same, and means actuated by the movement of the lever for automatically changing the position of the ram for effecting alternate speed changes through said lever.

34. In combination with a transmission mechanism having a gear shifter rod, a lever pivoted between its ends and connected to said shifter rod, a pair of arms carried by said lever, and bodily movable means co-operating with said arms, and a latch bar centrally pivoted to said bodily movable means to alternately engage said arms upon a predetermined bodily movement of said means for moving said shifter rod.

35. The combination with a motor vehicle transmission and clutch therefor, of means operated upon the movement of the clutch pedal beyond clutch releasing position for shifting the transmission through its various speed positions, means whereby the transmission may be automatically shifted between its intermediate and direct drive positions by said clutch pedal, manually controlled selector means for preselecting the various speeds of the transmission and also the automatic means, and means serving in the initial movement of the selector means into automatic position to cause the transmission to be at all times shifted into its intermediate speed position in the first movement of the clutch pedal beyond clutch releasing position.

In testimony that I claim the foregoing as my invention, I affix my signature this 20th day of May, 1924.

LEON JAY CAMPBELL.